(12) United States Patent
Dong et al.

(10) Patent No.: US 9,773,009 B2
(45) Date of Patent: Sep. 26, 2017

(54) METHODS AND APPARATUS FOR OBTAINING STRUCTURED INFORMATION IN FIXED LAYOUT DOCUMENTS

(71) Applicants: PEKING UNIVERSITY FOUNDER GROUP CO., LTD., Beijing (CN); BEIJING FOUNDER APABI TECHNOLOGY LIMITED, Beijing (CN)

(72) Inventors: Ning Dong, Beijing (CN); Wenjuan Huang, Beijing (CN); Baoliang Zhang, Beijing (CN)

(73) Assignees: Beijing Founder Apabi Technology Limited, Beijing (CN); Peking University Founder Group Co., Ltd., Beijing (CN)

( * ) Notice: Subject to any disclaimer, the term of this patent is extended or adjusted under 35 U.S.C. 154(b) by 206 days.

(21) Appl. No.: 14/119,109

(22) PCT Filed: Dec. 7, 2012

(86) PCT No.: PCT/CN2012/086137
§ 371 (c)(1),
(2) Date: Nov. 20, 2013

(87) PCT Pub. No.: WO2013/083067
PCT Pub. Date: Jun. 13, 2013

(65) Prior Publication Data
US 2014/0289274 A1    Sep. 25, 2014

(30) Foreign Application Priority Data
Dec. 9, 2011 (CN) .......................... 2011 1 0409463

(51) Int. Cl.
*G06F 7/00* (2006.01)
*G06F 17/30* (2006.01)
(Continued)

(52) U.S. Cl.
CPC ...... *G06F 17/30109* (2013.01); *G06F 17/218* (2013.01); *G06F 17/2229* (2013.01);
(Continued)

(58) Field of Classification Search
None
See application file for complete search history.

(56) References Cited

U.S. PATENT DOCUMENTS 6,097,841 A * 8/2000 Gunji ................. G06K 9/72
382/229
6,738,515 B1 * 5/2004 Akagi ................. G06K 9/6206
382/187

(Continued)

FOREIGN PATENT DOCUMENTS

CN    101354727 A    1/2009
CN    101458680 A    6/2009
(Continued)

OTHER PUBLICATIONS

PCT/CN2012/086137 English Translation of the International Search Report mailed Mar. 14, 2013, 3 pages.

*Primary Examiner* — Hasanul Mobin
(74) *Attorney, Agent, or Firm* — Lathrop Gage LLP (57) ABSTRACT

The present application discloses a method and an apparatus for obtaining structured information in a fixed layout document to improve the structuring speed for information management of a fixed layout document. The method may comprise: determining initial page number information corresponding to current directory entry of the document; segmenting first article content of a page corresponding to the initial page number information into at least one structured-characters-block; searching in each structured-characters-block for a first structured-characters-block which matches with name strings of the current directory entry, and obtaining first position information about where the first
(Continued)

structured-characters-block is located in the first article content; and obtaining initial position information of the current directory entry and end position information of the previous directory entry based on the first position information.

6 Claims, 5 Drawing Sheets (51) Int. Cl.
  *G06F 17/21* (2006.01)
  *G06F 17/22* (2006.01)
  *G06K 9/00* (2006.01)
(52) U.S. Cl.
  CPC .... *G06F 17/2247* (2013.01); *G06F 17/30542* (2013.01); *G06K 9/00442* (2013.01)

(56) References Cited

U.S. PATENT DOCUMENTS

| | | | | |
|---|---|---|---|---|
| 7,383,500 | B2 * | 6/2008 | Shur | G06F 17/217 707/E17.008 |
| 8,254,681 | B1 * | 8/2012 | Poncin | G06F 17/27 382/173 |
| 2003/0215137 | A1 * | 11/2003 | Wnek | G06K 9/00469 382/181 |
| 2004/0122806 | A1 * | 6/2004 | Sang, Jr. | G06F 17/211 |
| 2007/0180357 | A1 * | 8/2007 | McGatha | G06F 17/27 715/234 |
| 2007/0180358 | A1 * | 8/2007 | McGatha | G06F 17/2247 715/234 |
| 2008/0062186 | A1 * | 3/2008 | Nakamura | G06F 17/26 345/551 |
| 2008/0263033 | A1 | 10/2008 | Vailaya et al. | |
| 2011/0135209 | A1 * | 6/2011 | Oba | G06K 9/346 382/224 |
| 2012/0102388 | A1 * | 4/2012 | Fan | G06F 17/2264 715/234 |
| 2012/0140979 | A1 * | 6/2012 | Nishiwaki | B07C 3/14 382/101 |
| 2012/0324341 | A1 * | 12/2012 | Dejean | G06F 17/211 715/243 |

FOREIGN PATENT DOCUMENTS

| | | |
|---|---|---|
| CN | 101571859 A | 11/2009 |
| CN | 101739391 A | 6/2010 |

\* cited by examiner

```xml
<Catalog>
  <catalogRow chapterName="第一章风险管理与金融衍生物" ebookPageNum="8">
    <catalogRow chapterName="§1.1风险和风险管理" ebookPageNum="8" />
    <catalogRow chapterName="§1.2远期合约与期货" ebookPageNum="9" />
    <catalogRow chapterName="§1.3期权" ebookPageNum="10" />
    <catalogRow chapterName="§1.4期权定价" ebookPageNum="12" />
    <catalogRow chapterName="§1.5交易者的类型" ebookPageNum="13" />
  </catalogRow>
  <catalogRow chapterName="第二章无套利原理" ebookPageNum="16">
    <catalogRow chapterName="§2.1金融市场与无套利原理" ebookPageNum="16" />
    <catalogRow chapterName="§2.2欧式期权定价估计及平价公式" ebookPageNum="19" />
    <catalogRow chapterName="§2.3美式期权定价估计及提前实施" ebookPageNum="22" />
    <catalogRow chapterName="§2.4期权定价对敲定价格的依赖关系" ebookPageNum="25" />
  </catalogRow>
  <catalogRow chapterName="第三章期权定价的离散模型—叉树方法" ebookPageNum="31">
    <catalogRow chapterName="§3.1一个例子" ebookPageNum="31" />
    <catalogRow chapterName="§3.2单时段—双状态模型" ebookPageNum="32" />
    <catalogRow chapterName="§3.3欧式期权定价的二叉树方法（Ⅰ）—不支付红利" ebookPageNum="39" />
    <catalogRow chapterName="§3.4欧式期权定价的二叉树方法（Ⅱ）—支付红利" ebookPageNum="46" />
    <catalogRow chapterName="§3.5美式期权定价的二叉树方法" ebookPageNum="49" />
    <catalogRow chapterName="§3.6美式看涨与看跌期权定价的对称关系式" ebookPageNum="56" />
  </catalogRow>
  <catalogRow chapterName="第四章Brown运动与Ito公式" ebookPageNum="63">
    <catalogRow chapterName="§4.1随机游动与Brown运动" ebookPageNum="63" />
    <catalogRow chapterName="§4.2原生资产价格演化的连续模型" ebookPageNum="66" />
    <catalogRow chapterName="§4.3二次变差定理" ebookPageNum="69" />
    <catalogRow chapterName="§4.4Ito积分" ebookPageNum="72" />
    <catalogRow chapterName="§4.5Ito公式" ebookPageNum="74" />
  </catalogRow>
  <catalogRow chapterName="第五章欧式期权定价—Black-Scholes公式" ebookPageNum="81">
    <catalogRow chapterName="§5.1历史回顾" ebookPageNum="81" />
    <catalogRow chapterName="§5.2Black-Scholes方程" ebookPageNum="82" />
    <catalogRow chapterName="§5.3Black-Scholes公式" ebookPageNum="87" />
    <catalogRow chapterName="§5.4Black-Scholes模型的推广（Ⅰ）—支付红利" ebookPageNum="90" />
    <catalogRow chapterName="§5.5Black-Scholes模型的推广（Ⅱ）—两值期权与复合期权" ebookPageNum="96" />
    <catalogRow chapterName="§5.6数值方法（Ⅰ）—差分方法" ebookPageNum="101" />
    <catalogRow chapterName="§5.7数值方法（Ⅱ）—二叉树方法与差分方法" ebookPageNum="109" />
    <catalogRow chapterName="§5.8欧式期权价格的性质" ebookPageNum="113" />
    <catalogRow chapterName="§5.9风险管理" ebookPageNum="117" />
  </catalogRow>
  <catalogRow chapterName="第六章美式期权定价与最佳实施策略" ebookPageNum="123">
    <catalogRow chapterName="§6.1永久美式期权" ebookPageNum="123" />
    <catalogRow chapterName="§6.2美式期权的模型" ebookPageNum="135" />
    <catalogRow chapterName="§6.3美式期权的分解" ebookPageNum="138" />
    <catalogRow chapterName="§6.4美式期权价格的性质" ebookPageNum="145" />
    <catalogRow chapterName="§6.5最佳实施边界" ebookPageNum="158" />
    <catalogRow chapterName="§6.6数值方法（Ⅰ）—差分方法" ebookPageNum="177" />
    <catalogRow chapterName="§6.7数值方法（Ⅱ）—切片法" ebookPageNum="189" />
    <catalogRow chapterName="§6.8其它形式的美式期权" ebookPageNum="200" />
  </catalogRow>
  <catalogRow chapterName="第七章多资产期权" ebookPageNum="209" />
  <catalogRow chapterName="第八章路径有关期权（Ⅰ）—弱路径有关期权" ebookPageNum="254" />
  <catalogRow chapterName="第九章路径有关期权（Ⅱ）—强路径有关期权" ebookPageNum="284" />
  <catalogRow chapterName="第十章隐含波动率" ebookPageNum="322" />
  <catalogRow chapterName="参考文献" ebookPageNum="334" />
  <catalogRow chapterName="名词索引" ebookPageNum="337" />
</Catalog>
```

FIG. 3

```
- <catalogRow chapterName="第一章风险管理与金融衍生物" ebookPageNum="8" ebookEndPageNum="15" left="1389"
    top="394" right="3362" buttom="579" startVerticalPos="394" endVerticalPos="2341">
    <catalogRow chapterName="§1.1风险和风险管理" ebookPageNum="8" ebookEndPageNum="8" left="1836"
      top="1740" right="2923" buttom="1894" startVerticalPos="1740" endVerticalPos="4963" />
    <catalogRow chapterName="§1.2远期合约与期货" ebookPageNum="9" ebookEndPageNum="9" left="1523"
      top="1664" right="2598" buttom="1817" startVerticalPos="1664" endVerticalPos="4952" />
    <catalogRow chapterName="§1.3期权" ebookPageNum="10" ebookEndPageNum="11" left="888" top="320"
      right="1291" buttom="439" startVerticalPos="320" endVerticalPos="4561" />
    <catalogRow chapterName="§1.4期权定价" ebookPageNum="12" ebookEndPageNum="12" left="849" top="320"
      right="1441" buttom="449" startVerticalPos="320" endVerticalPos="5185" />
    <catalogRow chapterName="§1.5交易者的类型" ebookPageNum="13" ebookEndPageNum="15" left="1539"
      top="460" right="2510" buttom="613" startVerticalPos="460" endVerticalPos="2341" />
  </catalogRow>
- <catalogRow chapterName="第二章无套利原理" ebookPageNum="16" ebookEndPageNum="30" left="1740" top="396"
    right="3016" buttom="587" startVerticalPos="396" endVerticalPos="4082">
    <catalogRow chapterName="§2.1金融市场与无套利原理" ebookPageNum="16" ebookEndPageNum="18"
      left="1674" top="2370" right="3071" buttom="2516" startVerticalPos="2370" endVerticalPos="4870" />
    <catalogRow chapterName="§2.2欧式期权定价估计及平价公式" ebookPageNum="19" ebookEndPageNum="21"
      left="1227" top="4286" right="2934" buttom="4431" startVerticalPos="4286" endVerticalPos="5114" />
    <catalogRow chapterName="§2.3美式期权定价估计及提前实施" ebookPageNum="22" ebookEndPageNum="24"
      left="870" top="293" right="2293" buttom="412" startVerticalPos="293" endVerticalPos="5172" />
    <catalogRow chapterName="§2.4期权定价对敲定价格的依赖关系" ebookPageNum="25" ebookEndPageNum="30"
      left="1127" top="3323" right="2944" buttom="3468" startVerticalPos="3323" endVerticalPos="4082" />
  </catalogRow>
```

FIG. 4

```
  </catalogRow>
<catalogRow chapterName="§1.4期权定价" ebookPageNum="12" ebookEndPageNum="12" left="849" top="320" right="1441"
  buttom="449" startVerticalPos="320" endVerticalPos="5185">
- <content>
    <![CDATA[ '1.4期权定价互1.4期权定价    期权作为一种衍生证券，它的定价决定于原生    资产价格的变化.由于原生资产是一种风险资
    产，因此它的价格变化是随机的.由此产生的期权的价格变化亦必是随机的.但是一旦原生资产价格确定下来，那么作为它的衍生证券（期权）的价格亦将随
    </content>
</catalogRow>
<catalogRow chapterName="§1.5交易者的类型" ebookPageNum="13" ebookEndPageNum="15" left="1539" top="460"
  right="2510" buttom="613" startVerticalPos="460" endVerticalPos="2341">
- <content>
    <![CDATA[ '1.5交易者的类型参与衍生证券市场交易的人群有以下三类:         1.套期保值者(hedger).套期保值(hedging):两面下
    注避免损失.大多数生产商或贸易商参与衍生证券市场交易的目的是转移或减少现货市场的价格风险，确保本身获取预期利润.        例某中    国公司90天
    </content>
</catalogRow>
:/catalogRow>
catalogRow chapterName="第二章无套利原理" ebookPageNum="16" ebookEndPageNum="30" left="1740" top="396" right="3016"
  buttom="587" startVerticalPos="396" endVerticalPos="4082">
  <content>
    <![CDATA[ 第二章    无套利原理    中国民间有句谚语"天上不掉馅饼"，，西方亦有一句谚语    "there's no suchthing as a free
    lunch'，(世上没有免费的午餐).这两句谚语在金融上的意思:不承担风险就不存在瞬间获取利益的机会.用一句金融术语，即不存在套利的机会无套利原理
    </content>
<catalogRow chapterName="§2.1金融市场与无套利原理" ebookPageNum="16" ebookEndPageNum="18" left="1674" top="2370"
  right="3071" buttom="2516" startVerticalPos="2370" endVerticalPos="4870">
- <content>
```

METHODS AND APPARATUS FOR OBTAINING STRUCTURED INFORMATION IN FIXED LAYOUT DOCUMENTS

CROSS REFERENCE TO RELATED APPLICATIONS

This application is a 35 USC §371 National Stage application of International Application No. PCT/CN2012/086137 filed Dec. 7, 2012, which claims the benefit of priority to China Patent Application No. 201110409463.X filed Dec. 9, 2011. The disclosure of each of the prior applications is considered part of and is incorporated by reference in the disclosure of this application.

TECHNICAL FIELD

The present application relates to a technical field of information processing, in particular, to a method and an apparatus for obtaining structured information in a fixed layout document.

BACKGROUND

For informatization management of book fixed layout documents, it is required to structure each fixed layout document, such that structured information of each fixed layout document can be obtained to form corresponding directory data. Currently, the formed directory data of the fixed layout document may only include name strings and an initial position of each directory entry, but does not include an end position of each directory entry as well as a specific area where the name of each directory entry is located in the document.

In this regard, the current structured information of the fixed layout document are incomplete, and thus the specific initial and end positions corresponding to each directory entry cannot be determined according to the current directory data. Therefore, the specific directory entry of the fixed layout document cannot be read in a layout mode and a streaming mode. That is, it does not satisfy the diversified demands.

Accordingly, during a process of structuring each fixed layout document, more complete structured information of each fixed layout document need to be obtained. Generally, the fixed layout document may be structured manually, that is, contents of each directory entry in the fixed layout document need to be read and analyzed in order to obtain the required structured information manually. For an information management of a large number of fixed layout documents, there must be some errors due to manual limitations, such as intelligence or physical power. Furthermore, manual speed is relatively slow. Therefore, the accuracy and speed for obtaining the structured information is affected.

SUMMARY

The present application intends to provide a method and an apparatus for obtaining structured information in a fixed layout document to improve the structuring speed for a fixed layout document in information management.

According to one embodiment of the present application, a method for obtaining structured information in a fixed layout document is provided. The method may comprise:
determining initial page number information corresponding to a current directory entry of the document;
segmenting, according to content attributes, a first article content of a page corresponding to the determined initial page number information into at least one structured-characters-block;
searching for a first structured-characters-block which matches with name strings of the current directory entry in each segmented structured-characters-block, and obtaining first position information about where the searched first structured-characters-block is located in the first article content; and
obtaining initial position information of the current directory entry and end position information of a previous directory entry based on the obtained first position information.

According to another embodiment of the present application, an apparatus for obtaining structured information in a fixed layout document is provided. The apparatus may comprise a determining unit, a segmenting unit, a matching unit and an obtaining unit. The determining unit may be configured to determine initial page number information corresponding to current directory entry of the document. The segmenting unit may be configured to divide a first article content of a page corresponding to the initial page number information into at least one structured-characters-block. The matching unit may be configured to search for a first structured-characters-block which matches with the name strings of the current directory entry in each structured-characters-block and to obtain the first position information t. The obtaining unit may be configured to obtain initial position information of the current directory entry and end position information of the previous directory entry based on the first position information.

In the embodiments of the present invention, the first article content of the page corresponding to the initial page number information may be segmented into at least one structured-characters-block, the first structured-characters-block which matches with name strings of the current directory entry in each structured-characters-block will be searched, and the first position information may be obtained. Then, the initial position information of the current directory entry and the end position information of the previous directory entry may be determined based on the first position information. Therefore, the structured information of the fixed layout document may be obtained by analyzing and matching the article content of a particular page. Hence, the structuring speed of the fixed layout document may be faster

BRIEF DESCRIPTION OF THE DRAWING

FIG. 3 is a schematic diagram illustrating directory data information of a fixed layout document according to an embodiment of the present application;

FIG. 4 is a schematic diagram illustrating the updated directory data information of the fixed layout document according to an embodiment of the present application;

FIG. 5 is a schematic diagram illustrating the structured data information of the fixed layout document according to an embodiment of the present application.

DETAILED DESCRIPTION

According to embodiments of the present invention, contents on a particular page are analyzed and matched to obtain structured information of the fixed layout document. Therefore, the structuring speed of the fixed layout document can be faster.

Figure 1:
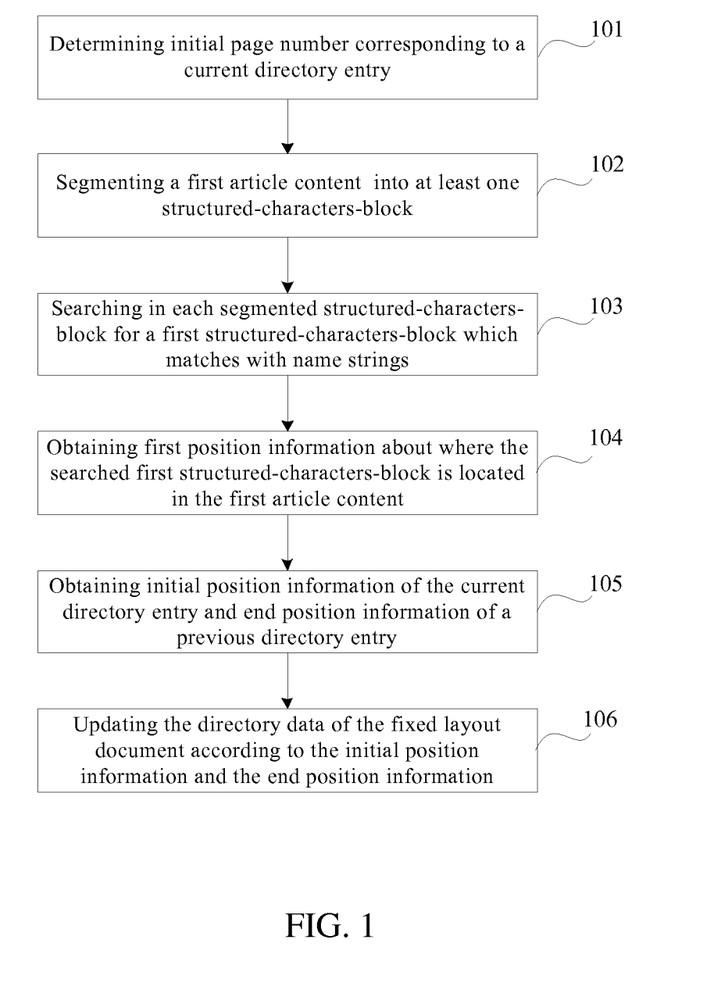
FIG. 1 is a flowchart illustrating a method for obtaining structured information of a fixed layout document according to an embodiment of the present application.

Referring to FIG. 1, a process for obtaining structured information of a fixed layout document according to an embodiment of the present invention may include the following steps.

Step 101: determining initial page number corresponding to the current directory entry of the document.

For an information management of the fixed layout document, the directory data information of the fixed layout document has been loaded. The directory data information may include hierarchical relationship, name strings of a directory entry as well as the initial page number corresponding to the directory entry. The directory data information may be described through a XML file format or other customized TXT file format or EXCEL file format.

In this manner, a specific directory entry, which needs to be read in a layout mode and a streaming mode, may be determined as the current directory entry. Or, any directory entry of the directory data information may be determined as the current directory entry, and the initial page number corresponding to the current directory entry may be found from the directory data information.

According to an embodiment of the present application, in order to improve an accuracy for obtaining the structured information, effectiveness of the directory data information of the loaded fixed layout document, such as the hierarchical relationship of the directory entry and effectiveness of the initial page number of the directory entry etc., may be analyzed before determining the initial page number corresponding to the current directory entry.

Step 102: segmenting a first article contents of a page corresponding to the initial page number information into at least one structured-characters-block.

Generally, the fixed layout documents have common features, for example, differences of a font size and a format between characters of directory and characters of main body of the document may be large. Additionally, differences between a first line-spacing between directories and the main body of the document and a second line-spacing among the characters of main body of the document may also be large. Therefore, in embodiments of the present application, the first article contents may be segmented into one, two or multiple structured-characters-blocks according to the differences of the font size and the format and according to the difference between the first line-spacing and the second line-spacing.

Accordingly, the content attribute information may include character information and line-spacing information. In embodiments of the present application, the structured-characters-blocks may include structured-character-paragraphs or structured-character-lines In this regard, the first article contents may be segmented into respective structured-character-paragraphs or structured-character-lines by automating them into segments or lines, according to the differences of said font size and said format and according to the difference between said first line-spacing and said second line-spacing.

Step 103: searching in each structured-characters-block for a first structured-characters-block which matches with the name strings of the current directory entry.

In embodiments of the present application, the first structured-characters-block which matches with the name strings of the current directory entry may be searched in each structured-characters-block by using a preset matching module. The matching module may be varied such that the searching process may also be varied.

Step 104: obtaining first position information about where the first structured-characters-block is located in the first article content.

Since the first structured-characters-block matched with the name strings of the current directory entry has been found, the first position information about where the first structured-characters-block is located in the first article content may be obtained. The first position information may include one or more selected from a group consisting of the page number of the page on which the first structured-characters-block is located, coordinate information, coordinate information of a transverse start line and coordinate information of a transverse end line.

Step 105: obtaining initial position information of the current directory entry and end position information of the previous directory entry based on the first position information.

Generally, the first position information may be used to determine the initial position information of the current directory entry, and the position information of the previous structured-characters-block of the first structured-characters-block may be used to determine the end position information of the previous directory entry.

However, when the first position information refers to a position where the end structured-characters-block is located in the first article content, the second article content of next page of the page corresponding to the initial page number information may be segmented into at least one structured-characters-block according to the attribute information of the characters. Furthermore, the initial position information of the current directory entry may be determined based on the first position information and the position information about where an initial structured-characters-block is located in the second article content. That is, the initial position information of the current directory entry may be determined by combing the both position information as stated above.

When the first position information refers to a position where the initial structured-characters-block is located in the first article content, a third article content of previous page of the page corresponding to the initial page number information may be segmented into at least one structured-characters-block according to the attribute information of the character. Furthermore, the end position information of the previous directory entry may be determined based on the first position information and the position information about where the end structured-characters-block is located in the third article content. That is, the initial position information of the current directory entry may be determined by combing the both position information.

Accordingly, the structured information of the current directory entry can be obtained. At the moment, the directory data information of the fixed layout document can be updated, that is, in embodiments of the present application, the method may further include the following step 106.

Step 106: updating the directory data information of the fixed layout document according to the initial position information of the current directory entry and the end position information of the previous directory entry.

Here, the determined initial position information of the current directory entry and the end position information of the previous directory entry may be added to a XML document corresponding to the directory data information.

In embodiments of the present application, the directory data information of the fixed layout document may be updated again after the structured information of all the directory entries are obtained.

Therefore, the structured information corresponding to the directory entry may be obtained by analyzing and matching the first article content of the page corresponding to the initial page number, the second article content of the next page of the page corresponding to the initial page number information, or the third article content of the previous page of the page corresponding to the initial page number information. That is, the structured information of the fixed layout document may be obtained by analyzing and matching the article content of a particular page. Hence, the structuring speed of the fixed layout document may be faster.

Figure 2:
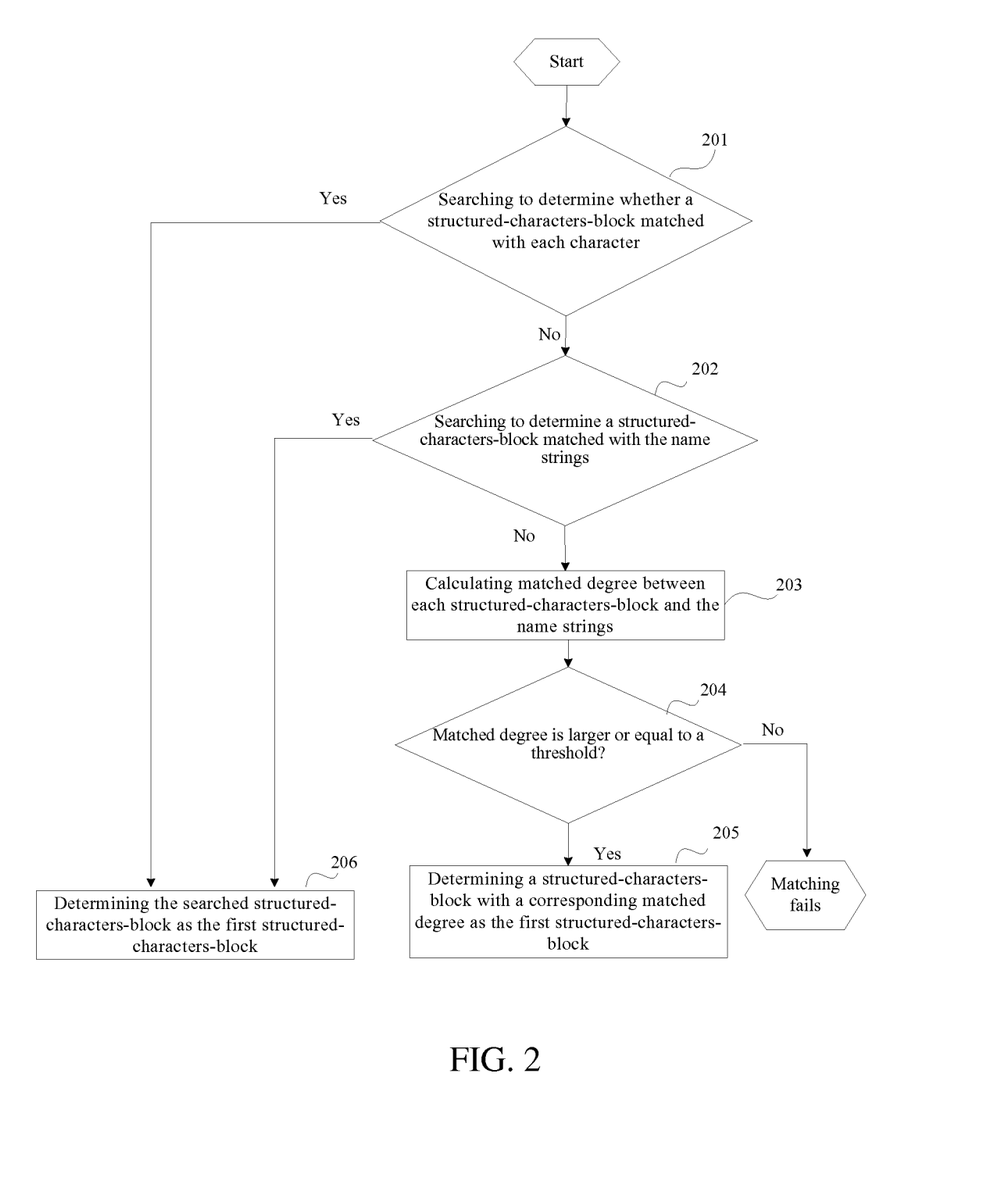
FIG. 2 is a flowchart illustrating a searching process according to an embodiment of the present application.

In the step 103, since the matching module may be varied, the searching process for searching the first structured-characters-block matching with the name strings of the current directory entry in each structured-characters-block may be varied. For example, it may be searched directly in each structured-characters-block whether there is a structured-characters-block matched with each character in the name strings of the current directory entry. If the fixed layout document has a relative high quality, the searching process can be completed by this method. In the embodiment of the present application, in order to increase success rate of the matching, other matching modules may be added. Referring to FIG. 2, the specific searching process may include the following steps.

Step 201: searching in each structured-characters-block to determine whether there is a structured-characters-block matched with each character in the name strings of the current directory entry, if yes, the process goes to step 204. Otherwise, the process goes to step 202.

Step 202: searching in each structured-characters-block to determine whether there is a structured-characters-block matched with the name strings of the current directory entry by using regular expression, if yes, the process goes to step 204. Otherwise, the process goes to step 203.

Here, since the step 201 fails to meet the matching requirements, the structured-characters-blocks and the characters of the name character of the current directory entry which affect the matching, such as spaces, modifiers or other characters may affect the matching, may be removed.

Then, the processed characters may be matched according to the preset regular expression, and the regular expression is an equation for matching a class of a character string with a pattern. The structured-characters-block matching with the name character of the current directory entry can be obtained by using the equation to match.

Step 203: calculating matched degree between each structured-characters-block and the name character of the current directory entry by one-by-one character matching.

For example, if one structured-characters-block is matched with half of characters of the name character of the current directory entry, then the matched degree may be 50%. Otherwise, other matched degree may be used.

Step 204: determining whether the matched degree is larger or equal to a threshold, if yes, the process goes to step 205. Otherwise, the matching process fails. The threshold may be adjusted to achieve a higher matched degree based on actual typesetting situation of various batches of the fixed layout documents.

Step 205: determining a structured-characters-block with a corresponding matched degree as the first structured-characters-block.

Step 206: determining the searched structured-characters-block as the first structured-characters-block.

The structured-characters-block matched with the name character of the current directory entry can be found substantially through the above steps. In the embodiments of the present application, before the step 201, each structured-characters-block and the name strings of the current directory entry need to be normalized to full-width characters or half-width characters in order to facilitate the subsequent searching.

Embodiments of the present application are further described below with reference to the attached figures.

In the embodiment, the directory data information of the fixed layout document is shown in FIG. 3, "第二章无套原理" may be taken as the name character of the current directory entry to describe, the process for obtaining the structured information of the fixed layout document may be discussed as below.

The initial page number corresponding to the current directory entry will be determined as "16". And then the process may comprise: segmenting a first article content of page 16 into at least one structured-characters-block according to content attribute information; searching in each structured-characters-block for a first structured-characters-block which matches with the name strings of the current directory entry; and obtaining first information of position where the first structured-characters-block is located in the first article content. Here, the first position information may include: "ebookPageNum="16" left="1740" top="396" right="3016" buttom="587" startVerticalPos="396" end VerticalPos="4082".

Since the first position information refers to the position where the initial structured-characters-block is located in the first article content, the third article content of page 15 are segmented into at least one structured-characters-block according to its content attribute information, and the position information about where the end structured-characters-block is located in the third article content can be obtained. As the end structured-characters-block is not matched with the name character of the current directory entry, the position information about where the end structured-characters-block is located the third article content is taken as the end position information of the previous directory entry. For example, the end position information may include: ebookEndLPageNum=15, endvertiempos=2341 and so on. The first position information is taken as the initial position information of the current directory entry, for example, the initial position information may include: ebookPageNum="16" left="1740" top="396" right="3016" buttom="587" startVerticalPos="396" endVerticalPos="4082".

The process for analyzing and matching the second article content of the next page of the page corresponding to the initial page number is similar to the process above and thus is omitted herein.

With the above mentioned process, the structured information of each directory can be obtained. Finally, the initial directory data information of the fixed layout document may be updated based on the obtained structured information. FIG. 4 shows the updated structured directory data information.

In the embodiments of the present application, the article content information corresponding to the directory entry may be added to the directory entry corresponding to the updated structured directory data information in order to form structured data information of the fixed layout document, as shown in FIG. 5. Therefore, a system will scan automatically the structured data information of all fixed layout documents to segment and output them, respectively, such that a layout reading mode and a streaming reading mode for the specific directory entry of the fixed layout document of a book can be provided alone.

Figure 6:
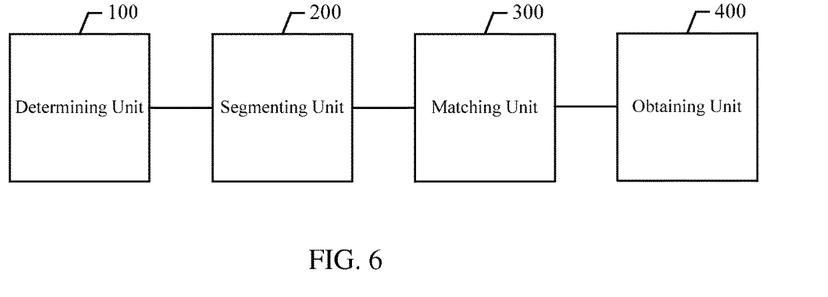
FIG. 6 is a structured diagram illustrating an apparatus for obtaining structured information in a fixed layout document according to an embodiment of the present application.

Based on the method for obtaining structured information in the fixed layout document, an apparatus for obtaining structured information of a fixed layout document may be provided, as shown in FIG. 6, and the apparatus may include a determining unit 100, a segmenting unit 200, a matching unit 300 and an obtaining unit 400.

The determining unit 100 may be configured to determine initial page number information corresponding to current directory entry.

The segmenting unit 200 may be configured to divide a first article content of a page corresponding to the initial page number information into at least one structured-characters-block.

The matching unit 300 may be configured to search in each structured-characters-block for a first structured-characters-block which matches with the name character of the current directory entry and to obtain first position information of the first structured-characters-block in the first article content.

The obtaining unit 400 may be configured to obtain initial position information of the current directory entry and end position information of the previous directory entry based on the first position information.

Specifically, the segmenting unit 200 is further configured to divide the first article content into at least one structured-characters-block according to the differences of the font size and the format between characters of directory and characters of main body of the document and according to the differences between the first line-spacing between directories and the main body of the document and the second line-spacing among the characters of main body of the document. The structured-characters-block may include a segment-structured-character or a line-structured-character.

Specifically, the matching unit 300 is further configured to search in each structured-characters-block to determine whether there is a structured-characters-block matched with each character in the name character of the current directory entry. If yes, the matching unit 300 determines the searched structured-characters-block as the first structured-characters-block. Otherwise, the matching unit 300 searches in each structured-characters-block whether there is a structured-characters-block matched with the name character of the current directory entry by using regular expression. If yes, the matching unit 300 determines the searched structured-characters-block as the first structured-characters-block. Otherwise, the matching unit 300 calculates matched degree between each structured-characters-block and the name character of the current directory entry by one-by-one character matching. When the matched degree reaches the preset threshold, the matching unit 300 determines a structured-characters-block with a corresponding matched degree as the first structured-characters-block.

The matching unit 300 may further be configured to unify each structured-characters-block and the name character of the current directory entry to full-width characters or half-width characters.

The obtaining unit 400 may further be configured to determine the first position information to the initial position information of the current directory entry, and to determine the position information of the previous structured-characters-block of the first structured-characters-block to the end position information of the previous directory entry.

The obtaining unit 400 may further be configured to divide a second article content of next page of the page corresponding to the initial page number information into at least one structured-characters-block according to the attribute information of the character, when the first position information refers to a position where the end structured-characters-block is located in the first article content. Furthermore, the obtaining unit 400 may be configured to determine the initial position information of the current directory entry based on the first position information and the position information about where the initial structured-characters-block is located in the second article content. Additionally, the obtaining unit 400 may further be configured to divide the third article contents of previous page of the page corresponding to the initial page number information into at least one structured-characters-block according to the attribute information of the character, when the first position information refers to a position where the initial structured-characters-block is located in the first article content. Furthermore, the obtaining unit 400 may be configured to determine the end position information of the previous directory entry based on the first position information and the position information about where the end structured-characters-block is located in the third article content.

In the embodiments of the present application, the structured information of the fixed layout document may be obtained by analyzing and matching the article content of a particular page. Hence, the structuring speed of the fixed layout document may be faster.

Furthermore, the searching process for searching the first structured-characters-block matching with the name character of the current directory entry in each structured-characters-block may be varied. If one matching manner fails, there are other matching manners, such that the success rate of matching can be increased.

In addition, during a process for structuring data of a large number of fixed layout documents, the matching process can be proceeded via a preset matching module without manual work so as to save a lot of manpower.

The foregoing is only preferred embodiments of the present application, and it is not intended to limit the present application. Moreover, it will be apparent to those skilled in the art that various modifications and variations can be made to the present application. Thus, any modifications, equivalent substitutions, improvements etc. within the spirit and principle of the present application should be included within the scope of protection of the application.

What is claimed is:

1. A computer-implemented method for obtaining structured information of a fixed layout document on a computer comprising a processor, the method comprising:
   determining, using the processor, initial page number information corresponding to a current directory entry of the document;
   segmenting, using the processor and according to content attributes, a first article content of a page corresponding to the determined initial page number information into at least one structured-characters-block;
   searching, using the processor, in each segmented structured-characters-block for a first structured-characters-block which matches with name strings of the current directory entry, and obtaining, using the processor, first position information about where the searched first structured-characters-block is located in the first article content; and obtaining, using the processor, initial position information of the current directory entry and end position information of a previous directory entry based on the obtained first position information, wherein the searching comprises:

searching, using the processor, in each structured-characters-block to determine whether there is a structured-characters-block matched with each character in the name strings of the current directory entry, if there is a structured-characters-block matched with each character in the name strings of the current directory entry, determining, using the processor, the searched structured-characters-block as the first structured-characters-block;

if there is no structured-characters-block matched with each character in the name strings of the current directory entry, searching, using the processor, in each structured-characters-block to determine whether there is a structured-characters-block matched with the name strings of the current directory entry by using regular expression,    if there is a structured-characters-block matched with the name strings of the current directory entry by using regular expression, determining, using the processor, the searched structured-characters-block as the first structured-characters-block;

if there is no structured-characters-block matched with the name strings of the current directory entry by using regular expression, calculating, using the processor, a matched degree between each structured-characters-block and the name strings of the current directory entry by one-by-one character matching, and    determining, using the processor, a structured-characters-block with the calculated matched degree as the first structured-characters-block, when the calculated matched degree reaches a preset threshold, wherein the step of obtaining initial position information of the current directory entry and end position information of the previous directory entry based on the first position information comprises:

when the first position information refer to a position where the end structured-characters-block is located in the first article content,    segmenting, according to character attributes, a second article content of next page of the page corresponding to the initial page number information into at least one structured-characters-block, and    determining the initial position information of the current directory entry based on the first position information and a position information about where the initial structured-characters-block is located in the second article content;

when the first position information refers to a position where the initial structured-characters-block is located in the first article content,    segmenting, according to the character attributes, a third article content of previous page of the page corresponding to the initial page number information into at least one structured-characters-block, and    determining the end position information of the previous directory entry based on the first position information and a position information about where the end structured-characters-block is located in the third article content.

2. The method according to claim 1, wherein the segmenting comprises:

segmenting the first article content into at least one structured-characters-block according to differences of a font size and a format between characters of directory and characters of main body of the document, and according to differences between: a first line-spacing between directories and the main body of the document, and a second line-spacing among the characters of main body of the document, wherein the structured-characters-block comprises a segment-structured-character or a line-structured-character.

3. The method according to claim 1, wherein before searching in each structured-characters-block to determine whether there is a structured-characters-block matched with each character in the name strings of the current directory entry, the method further comprises:

unifying each structured-characters-block and the name strings of the current directory entry into full-width characters or half-width characters.

4. An apparatus for obtaining structured information in a fixed layout document, the apparatus comprising:

a memory that stores executable components; and a processor, coupled to the memory, that executes the executable components to perform operations of the apparatus, the executable components comprising:

a determining unit configured to determine initial page number information corresponding to a current directory entry of the document;

a segmenting unit configured to divide a first article content of a page corresponding to the initial page number information into at least one structured-characters-block;

a matching unit configured to search for a first structured-characters-block which matches with the name strings of the current directory entry in each structured-characters-block, and to obtain first position information about where the searched first structured-characters-block is located in the first article content of the document; and a obtaining unit configured to obtain initial position information of the current directory entry based on the first position information, wherein the matching unit is further configured to determine whether there is a structured-characters-block matched with each character in the name strings of the current directory entry, if there is a structured-characters-block matched with each character in the name strings of the current directory entry, to determine the searched structured-characters-block as the first structured-characters-block;

if there is no structured-characters-block matched with each character in the name strings of the current directory entry, to further search in each structured-characters-block to determine whether there is a structured-characters-block matched with the name strings of the current directory entry by using regular expression,    if there is a structured-characters-block matched with the name strings of the current directory entry by using regular expression, to determine the searched structured-characters-block as the first structured-characters-block;

if there is no structured-characters-block matched with the name strings of the current directory entry by using regular expression, to calculate a matched degree between each structured-characters-block and the name strings of the current directory entry by one-by-one character matching, and to determine a structured-characters-block with the calculated matched degree as the first structured-characters-block, when the calculated matched degree reaches a preset threshold, when the first position information refers to a position where the end structured-characters-block is located in the first article content, the obtaining unit is further configured to divide, according to character attributes, a second article content of next page of the page corresponding to the initial page number information into at least one structured-characters-block, and determine the initial position information of the current directory entry based on the first position information and a position information about where the initial structured-characters-block is located in the second article content;

when the first position information refers to a position where the initial structured-characters-block is located in the first article content, the obtaining unit is further configured to divide, according to the character attributes, a third article content of previous page of the page corresponding to the initial page number information into at least one structured-characters-block, and determine the end position information of the previous directory entry based on the first position information and a position information about where the end structured-characters-block is located in the third article content.

5. The apparatus according to claim 4, wherein the segmenting unit is further configured to divide the first article content into at least one structured-characters-block according to:

differences of a font size and a format between characters of directory and characters of main body of the document, and according to differences between: a first line-spacing between directories and the main body of the document, and a second line-spacing among the characters of main body of the document, wherein the structured-characters-block comprises a segment-structured-character or a line-structured-character.

6. The apparatus according to claim 4, wherein the matching unit is further configured to unify each structured-characters-block and the name strings of the current directory entry into full-width characters or half-width characters.

* * * * *